Aug. 1, 1961 R. A. SULLIVAN 2,994,593
CRYSTAL GROWING APPARATUS
Filed Sept. 19, 1958
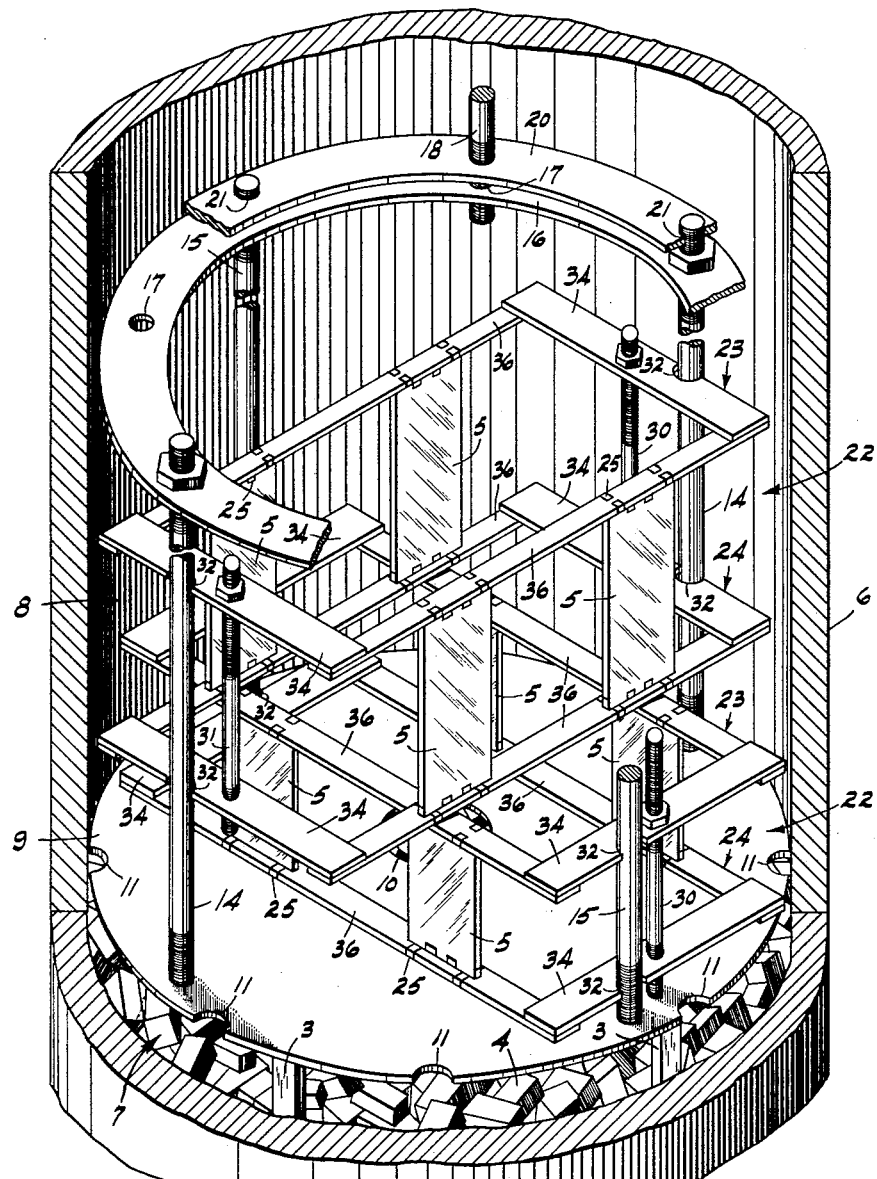
Fig. 1
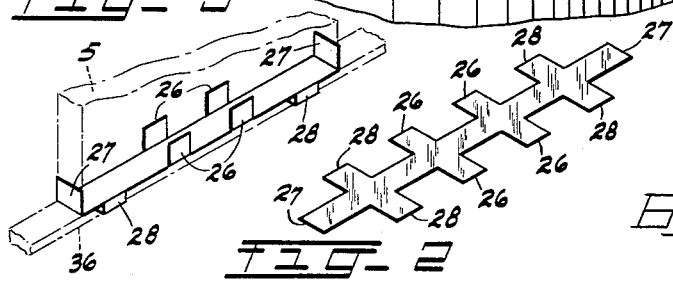
Fig. 3
Fig. 2
INVENTOR
R. A. SULLIVAN
By W. C. Parnell
ATTORNEY

United States Patent Office 2,994,593
Patented Aug. 1, 1961

2,994,593
CRYSTAL GROWING APPARATUS
Richard A. Sullivan, Danvers, Mass., assignor to Western Electric Company, Incorporated, New York, N.Y., a corporation of New York
Filed Sept. 19, 1958, Ser. No. 761,979
3 Claims. (Cl. 23—273)

This invention relates to crystal growing apparatus and its object is to orient and support a large number of crystal seed plates in the limited crystal growing region of a synthetic crystal grower.

In accordance with the general features of the invention, a device for supporting crystal seed plates above a nutrient dissolving region and in a crystal growing region of a synthetic crystal growing apparatus comprises a bottom plate with at least one opening therein for the flow of nutrient solution between the dissolving and growing regions and pairs of opposing parallel rods extending upwardly therefrom and attached to a ring at their upper ends. At least one unitary removable seed plate holder, supported on the bottom plate and slidably engaging a pair of the opposing rods, includes adjustably spaced upper and lower seed plate supports with seed plate retainers having tangs for engaging and holding the end of a seed plate, removably mounted on each support.

These and other features of the invention will be more fully understood from the following detailed description when taken in conjunction with the accompanying drawing, in which:

FIG. 1 is an isometric view of a seed plate support assembly with portions thereof as well as portions of associated structure broken away, and FIGS. 2 and 3 are isometric views of a seed plate retainer, as seen before and after attachment to a seed plate and plate support.

The embodiment of the invention shown in the drawing is for supporting a plurality of quartz seed plates 5 in an aqueous nutrient solution within growing region 8 of a cylindrical pressure chamber of an autoclave 6 which may be of the type disclosed in U.S. Patent No. 2,785,058 to E. Buehler and assigned to the Bell Telephone Laboratories, Inc., of New York, New York. Nutrient 4, consisting of small particles of natural or synthetic quartz, is contained in a lower nutrient dissolving region 7 of the pressure chamber immediately below the growing region 8.

The seed holding assembly supports the seed plates in spaced relation such that they may grow without interfering with each other, the surfaces of the seed holding structure, or the internal wall of the pressure chamber. The holding assembly is positioned in the desired region 8 by a bottom plate 9 of the assembly resting on locating elements 3 which may be made part of a basket for holding the nutrient 4. The bottom plate 9 is essentially circular so as to fit within the cylindrical pressure chamber 6 with very little clearance and serves as a baffle between the hot nutrient solution in region 7 and the cooler super-saturated solution in the growing region 8. A central aperture 10 and a plurality of peripheral openings 11 serve to limit circulation of the aqueous nutrient solution between regions 7 and 8 so that a desired temperature differential may be maintained between the two regions to produce the super-saturated solution in the region 8 to facilitate quartz depositing out of the solution onto the seeds 5.

Two pairs of opposing, parallel guide rods 14 and 15 extend upwardly from the baffle plate 9 and have a top member, ring 16, attached to their upper ends. Ring 16 has a number of holes 17 therein for receiving extensions of the lower ends of guide rods 18 of another seed holder assembly which may be stacked on the top ring 16. A portion of a lower support ring 20 of this other assembly also has a plurality of openings or holes 21 to receive the upper ends of guide rods 14 and 15 of the lower assembly. The two assemblies are therefore secured together by the nesting relation between the ends of the guide rods and the holes in adjacent rings 16 and 20. It is to be noted that unlike the corresponding support plate 9 of the lower assembly, the whole central portion of ring 20 is open and is similar to top ring 16 and does not restrict the flow of nutrient solution. Only one baffle is needed between the nutrient dissolving region 7 and the growing region 8, and this is incorporated in the bottom plate 9 of the lower assembly. Excepting for the lower ring 20 and the extensions of guide rods 18 below this ring for nesting in the top ring 16 of the lower assembly, the upper assembly is identical to the lower one; consequently, the details thereof are omitted from the drawing. The lower plate 9, the upper ring 16, and the interconnecting guide rods 14 and 15, as well as the corresponding structure, ring 20, guide rods 18 and top ring for the other upper assembly, for convenience will be designated the spacer ring subassembly in the discussion below. A plurality of seed holding assemblies, easy to handle individually, are stacked together to fill the full length of the growing region 8 of the autoclave. For example, for a growing region 8 of slightly greater than six feet, three two-foot assemblies are utilized.

Four seed plates 5 are secured in each of a plurality of adjustable seed plate holders 22 having upper and lower rectangular shaped apertured plate supports 23 and 24 with transverse end elements 34 and longitudinal side elements 36. Soft metal seed plate retainers 25 are removably mounted on the plate supports 23 and 24 and have tangs 26 bent into engagement with opposing main flat surfaces of the seed plate ends, tangs 27 bent to engage the opposite thin edges of the plate ends, and tangs 28 bent around the side elements 36 of the plate supports 23 and 24 to secure the retainers, and therefore the seed plates, between the supports 23—24. Spacing rods 30 and 31 at opposite ends of the plate holders 22 serve to make the plate holders 22 rigid structures and may be adjusted to accommodate seed plates of various lengths. As seen in the drawing, the upper plate holder 22 accommodates longer plates than does the lower plate holder 22. Arcuately shaped notches 32 in the transverse end elements 34 of the supports 23 and 24 make slidable engagement with the guide rods 14 or 15 (or 18 for the upper assembly) of each of the spacer ring assemblies and may be removed therefrom by disassembling the top ring 16. The lower ends of rods 30 and 31 of the lowermost unitary removable seed plate holder 22 engage or rest on the baffle plate 9 (in other assemblies stacked on top of this lowermost assembly the rods 30 and 31 would rest on the lower rings 20 thereof) and additional unitary seed plate holders 22 are stacked on top of one another so that the ends of rods 30 and 31 thereof are in non-interfering orientation. In order that the rods be so oriented, at least two pairs of opposing guide rods 15 are provided so that successive holders 22 may be alternately mounted in slidable relation between rods 15 and 16.

With the seeds secured in the holding structure as defined above, economical use is made of the available space within the growing chamber and by using a plurality of spacer ring assemblies together with full loading of holders 22 within each of the spacer ring assemblies, full use may be made of the total growing region 8 of the autoclave. The seeds 5 are disposed with the primary crystallographic axes horizontal so that the growth of the crystals will take place transverse the major axis of the pressure chamber and while the crystals will grow to embed the tangs 26 and 27 of the retainers, they will not grow around the supports 23 and 24. Since the ends of crystals are normally discarded and not usable in the fabrication of these devices, the embedding of the retainers 25 therein results in negligible loss. By making retainers 25 from soft ductile metal, such as low carbon steel, 1/100 of an inch thick, the grown crystals may be removed from the holders 22 after the assemblies have been pulled from the autoclave with a simple pulling and twisting action, thereby bending tangs 28 of the retainers to release them from the side elements 36 of the holders.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An assembly for supporting a plurality of crystal seed plates in a vertically disposed cylindrically chambered crystal growing region of a synthetic crystal growing apparatus having a nutrient dissolving region below the growing region, which comprises, a circular bottom plate with one central aperture and a plurality of peripheral apertures therein for the passage of nutrient solution therethrough, a flat ring top member disposed parallel to the bottom plate, at least one pair of opposing, parallel, vertical guide rods interconnecting the plate and top member, at least one unitary removable seed plate holder slidably engaging a pair of the rods and supported by the bottom plate, the holder comprising adjustably parallel spaced upper and lower seed plate supports and a plurality of seed plate retainers removably mounted on each support and tangs for engaging the end of a seed plate to hold the seed plate between the upper and lower plate supports, on each of the seed plate retainers.

2. An assembly according to claim 1 in which the retainers are made of soft ductile metal and the crystal seeds are supported with their crystalline axes disposed such that the tangs securing seed to holder are out of growth path permitting deformation of the tangs engaging the holder to remove the grown crystals therefrom.

3. A device for holding a plurality of crystal seed plates in a vertically disposed cylindrically chambered crystal growing region of a synthetic crystal growing apparatus having a nutrient dissolving region below the growing region, which comprises a plurality of vertically stacked assemblies, each having a spacer ring subassembly comprising an apertured bottom plate, an apertured upper flat ring member and a plurality of pairs of opposing, parallel, vertical guide rods interconnecting the plate and upper member, the ends of the guide rods of adjacent subassemblies nesting in the apertures of adjacent plate and ring members, and a plurality of unitary, removable seed plate holders stacked in staggered relation on top of one another in each of the subassemblies, each holder comprising adjustably parallel spaced upper and lower seed plate supports, each support having a flat rectangular configuration with the widest apart sides slidably engaging a pair of diagonally opposed guide rods, the lowermost holder in each subassembly being supported above the bottom plate thereof, and a plurality of seed plate retainers removably mounted on each support and tangs for engaging the end of a seed plate to hold the seed plate between the upper and lower plate supports on each seed plate retainer, and adjustable spacing rods for holding the supports apart prescribed distances to accommodate seed plates of various lengths, the widest apart sides of each holder being oriented horizontally 90 degrees away from the nearest adjacent holders thereby engaging a different pair of diagonally opposed guide rods.

References Cited in the file of this patent

UNITED STATES PATENTS

| | | |
|---|---|---|
| 1,296,337 | Sullivan | Mar. 4, 1919 |
| 1,830,702 | Johnson | Nov. 3, 1931 |
| 2,484,829 | Holden | Oct. 18, 1949 |
| 2,675,303 | Sobek | Apr. 13, 1954 |
| 2,785,058 | Buehler | Mar. 12, 1957 |

FOREIGN PATENTS

| | | |
|---|---|---|
| 860,045 | Germany | July 8, 1949 |